United States Patent [19]
Kuegler

[11] 3,992,589
[45] Nov. 16, 1976

[54] FREQUENCY MULTIPLEX SYSTEM FOR TRANSMISSION OF TELEPHONE AND VIDEOPHONE CHANNELS

[75] Inventor: Eberhard Kuegler, Germering, Germany

[73] Assignee: Siemens Aktiengesellschaft, Berlin & Munich, Germany

[22] Filed: May 10, 1973

[21] Appl. No.: 358,961

Related U.S. Application Data

[63] Continuation-in-part of Ser. No. 108,857, Jan. 27, 1971, abandoned.

[30] Foreign Application Priority Data

Jan. 29, 1970 Germany.............................. 2004011
Jan. 29, 1970 Germany.............................. 2003980

[52] U.S. Cl. ........................... 179/15 FS; 179/2 TV;
178/DIG. 23
[51] Int. Cl.² ........................................... H04J 1/12
[58] Field of Search .......... 179/15 R, 15 FO, 15 FS,
179/2 TV; 178/DIG. 23, 5.8

[56] References Cited
UNITED STATES PATENTS

| | | | |
|---|---|---|---|
| 3,046,329 | 7/1962 | Reesor................................. | 178/5.6 |
| 3,073,906 | 1/1963 | Lee..................... | 179/2 TV |

FOREIGN PATENTS OR APPLICATIONS

| | | | |
|---|---|---|---|
| 1,048,952 | 1/1959 | Germany........................... | 179/2 TV |

OTHER PUBLICATIONS

Bell System Technical Journal, vol. 13, No. 3, "A Theory of Scanning...," by P. Mertz et al., pp. 464–467.

"Simultaneous Transmission of Multichannel Telephone and Video–Telephone Signal by Analog Multiplex," Kawafune et al., June 1971, 7th International Conference on Communications.

Bell Laboratories Record, "Transmission Across Town or Across the Country," Nast et al., May/June 1969, pp. 165–168.

Philips Technical Review, "A 48–Channel Carrier Telephone System," Bast et al., vol. 9, No. 6, pp. 161–170.

*Primary Examiner*—David L. Stewart
*Attorney, Agent, or Firm*—Hill, Gross, Simpson, Van Santen, Steadman, Chiara & Simpson

[57] ABSTRACT

In a carrier frequency multiplex system for single sideband transmission of telephone channels which have been converted through the transmission position of the transmission band of the system through the utilization of carriers which are whole number multiples of 4 kHz, the transmission of videophone channels which have been converted from the video position to the transmission position with carriers that are chosen such that those video carriers corresponding to the frequency zero in the video position are multiples of 4 kHz in the transmission position.

14 Claims, 10 Drawing Figures

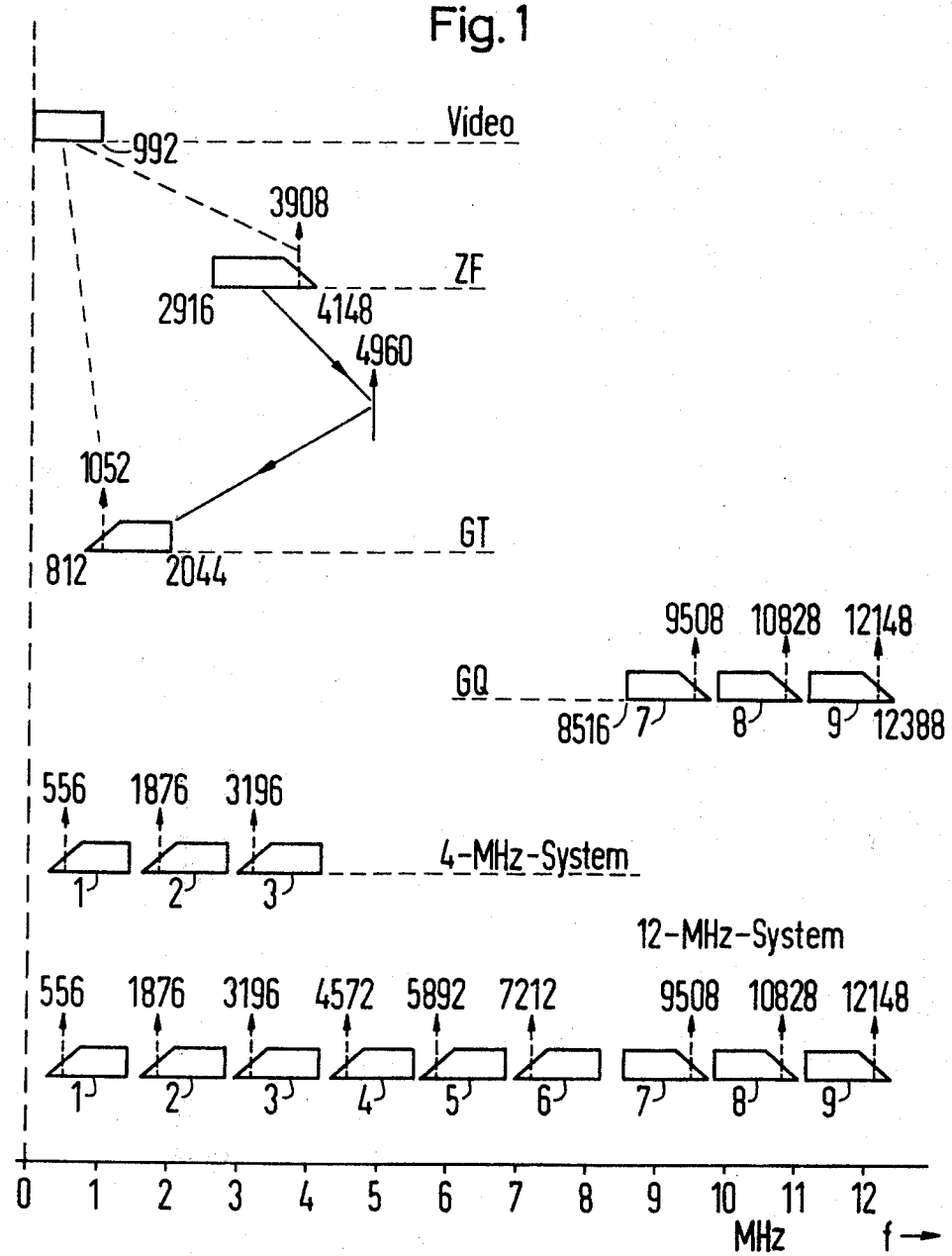

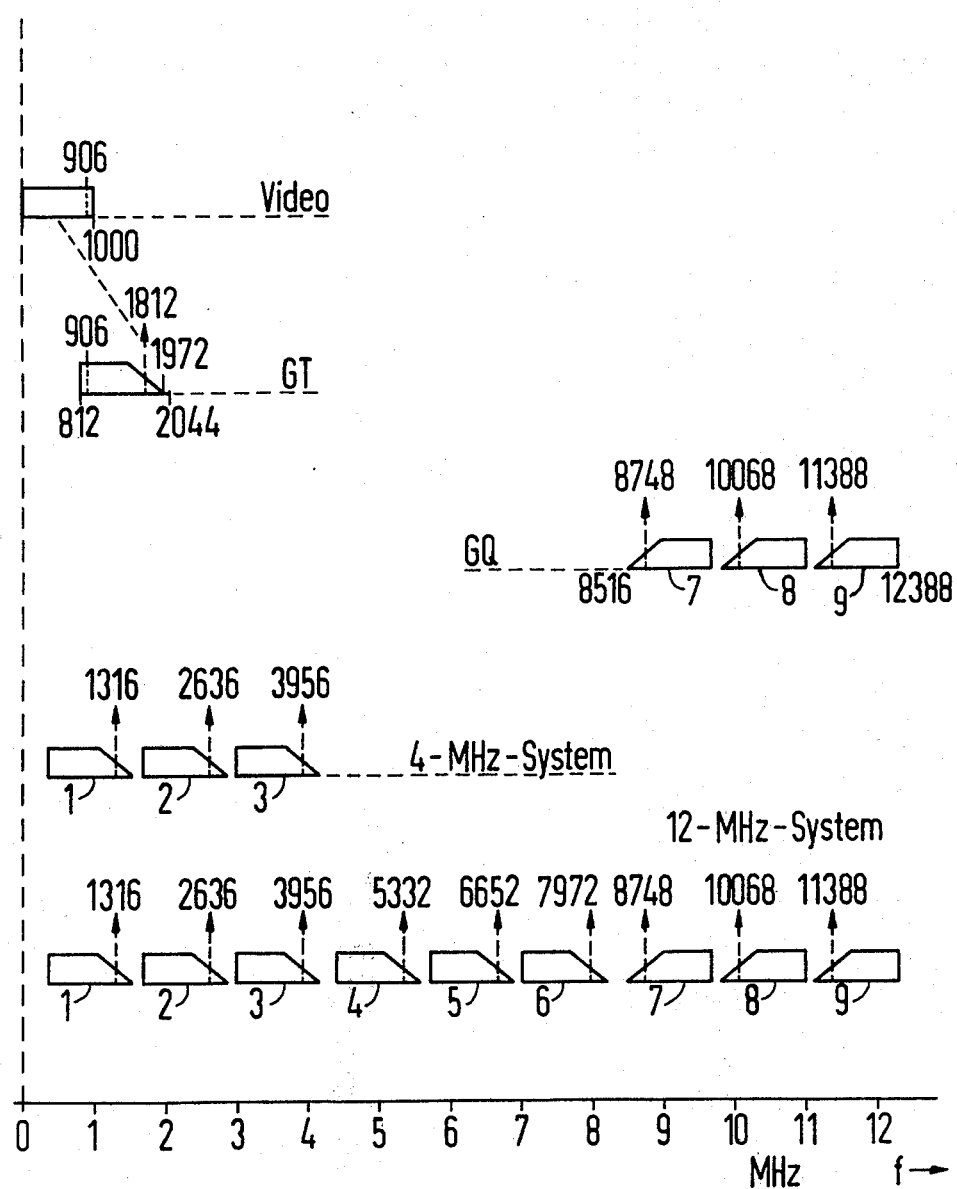

Fig. 5
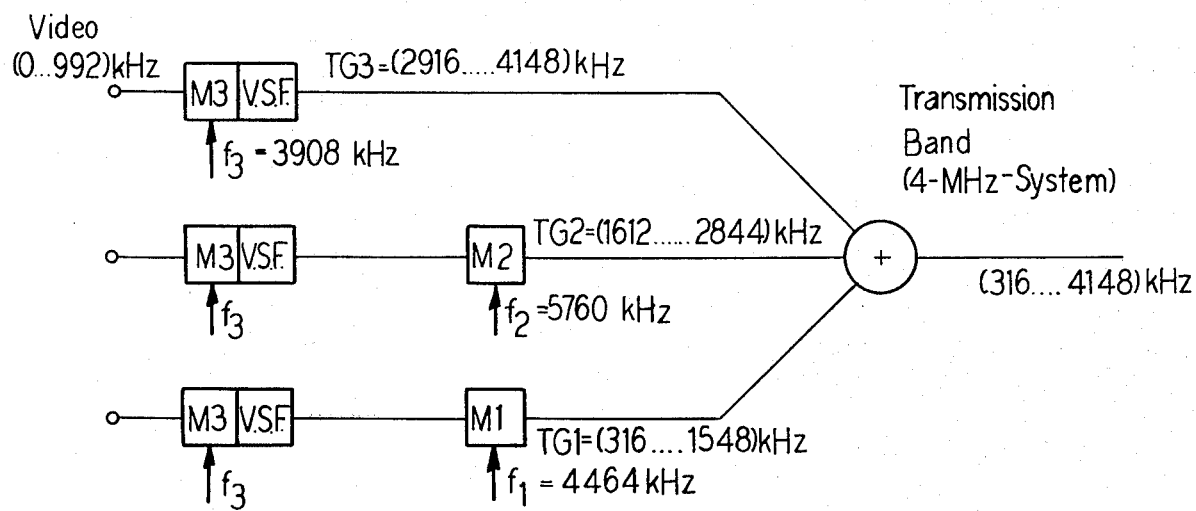
Fig. 6
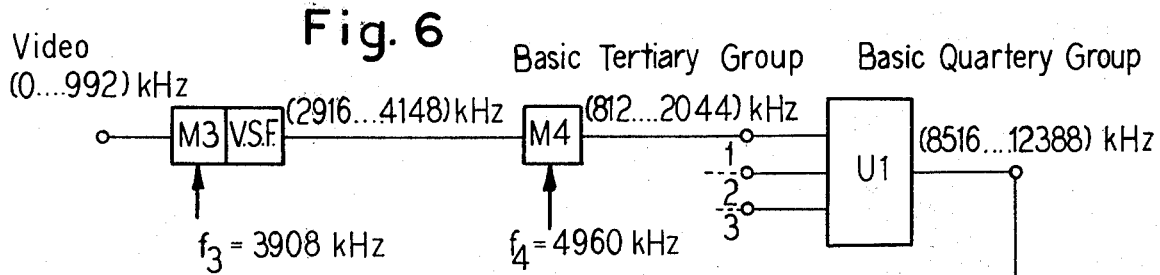
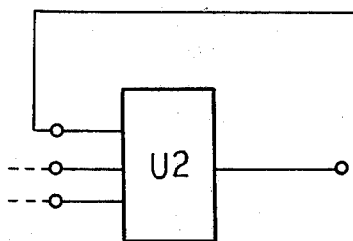

FREQUENCY MULTIPLEX SYSTEM FOR TRANSMISSION OF TELEPHONE AND VIDEOPHONE CHANNELS

CROSS REFERENCE TO RELATED APPLICATION

This application is a continuation-in-part application based on prior application of the same title, Ser. No. 108,857, filed Jan. 22, 1971 now abandoned.

BACKGROUND OF THE INVENTION

1. Field of the Invention

The invention relates to a frequency multiplex system for single side-band transmission of telephone channels converted in steps into the transmission position. These frequency multiplex systems are also called carrier frequency systems and have in most cases a construction in which the individual 4 kHz wide telephone channels are converted by carriers that represent whole-numbered multiples of 4 kHz into the transmission position.

2. Description of the Prior Art

According to the recommendations of the CCITT (Comite Consultatif International Telephonique et Telegraphique) the frequency plans of most wide-band carrier frequency systems find their frequency schedules based on a base primary group of 60 to 108 kHz with 12 telephone channels arrayed one adjacent another. Five of these primary groups are combined as a group into a 60-channel group, the base secondary group of 312 to 552 kHz. A further grouping can be achieved, for example, by the means that five base secondary groups are converted into a base tertiary group including 300 channels in the frequency position 812 to 2044 kHz. The carriers with which the individual channels are converted in one or more stages into the base primary group position and the carriers for the further conversion into the base tertiary group position are in each case whole-numbered multiples of 4 kHz.

The invention proceeds from the consideration that not only pure telephone channels, but also television-telephone or videophone channels should be transmitted on a frequency multiplex system basis. As long, however, as a long distance communication network designed especially for videophone transmission does not exist, it is logical, as is the case already for example with respect to data transmission, to use available frequency multiplex systems for the long distance traffic or videophone channels.

SUMMARY OF THE INVENTION

It is the primary object of the invention, therefore to provide a frequency multiplex system for single sideband transmission of telephone channels, which represent through carriers, the whole-numbered multiples of 4 kHz, which are converted in stages into the transmission position, to additionally transmit videophone channels without there arising any interference between the telephone transmission and the videophone transmission.

The above object is realized according to the invention by the means that the carriers for the one-or-more stages of conversion of the videophone channels from the video position into the transmission position are chosen in such a way that the videophone carriers corresponding to the frequency zero in the video position are in the transmission position multiples of 4 kHz.

According to the invention through the selection of the carrier frequencies it is provided that all the nonlinear products of any order of the videophone carriers present among one another are multiples of 4 kHz and always fall upon zero frequencies of the telephone channels. Thereby there is achieved the least possible interference of the telephone channels by videophone carriers.

In order to achieve a favorable noise balance it is advantageous to transmit the videophone channels after the conversion with residual sideband and Nyquist flank.

In further development of the invention the line frequency of the videophone signals is placed at 4 kHz or a whole-numbered multiple of 4 kHz. Through this choice of the line frequency it is provided that all the mixing products between the individual carrier-frequency videophone signals fall on zero frequencies of the telephone channels and does not interfere with the telephone conversations.

The most favorable frequencies for the line frequency in this example are 4 kHz itself, as well as 8 kHz, while the frequency 8 kHz is preferred in view of these chosen conditions.

Furthermore, there is provided a special advantage in the choice of the line frequency $f_z$ at 8 kHz and simultaneous fixing of the videophone carriers on odd-numbered multiples of 4 kHz. It is thereby provided that there is a grouping of all the spectral constituents of the videophone channels in the carrier frequency transmission position about frequencies that present odd-numbered multiples of 4 kHz. All the nonlinear mixing products of second order lie, accordingly, in the transmission position in the vicinity of whole-numbered multiples of 8 kHz, i.e., exactly in the half-line offset to the videophone useful signals and present, therefore small influences that are hardly perceptible to the eye.

All the converter frequencies of the tertiary and quaternary group converters stand then--as whole-numbered multiples of 8 kHz—likewise in the half-line offset to the videophone useful signals; i.e., their carrier residue cause less interference in the videophone signals.

BRIEF DESCRIPTION OF THE DRAWINGS

Other objects, features and advantages of the invention will be understood from the following detailed description taken in conjunction with the accompanying drawings in which:

FIG. 1 is a frequency diagram for two types of constructions of frequency multiplex systems according to the invention;

FIG. 2 is a frequency diagram for a third type of construction of the frequency multiplex system of the invention;

FIG. 5 is a schematic representation of apparatus for performing a frequency conversion, in accordance with the invention, for a 4 MHz transmission band;

FIG. 6 is a schematic representation of apparatus for converting videophone channels for transmission in a 12 MHz system or a 4 MHz system and utilizing conversion from a basic tertiary group to a basic quarternary group.

DESCRIPTION OF THE PREFERRED EMBODIMENTS

Figure 3A:
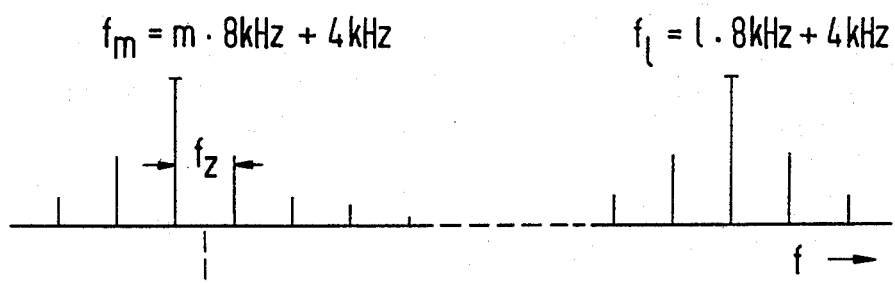
FIG. 3a–3d is a frequency diagram of the nonlinear mixing products in the case of a line frequency of 8 kHz and videophone carrier frequencies that are odd multiples of 4 kHz.
Figure 3B:
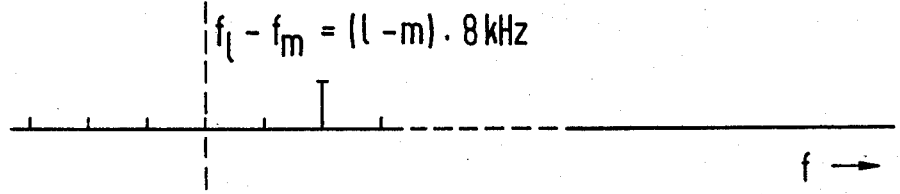
Figure 3C:
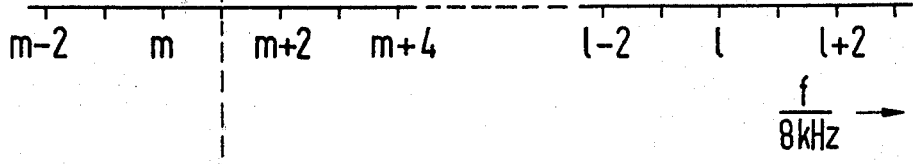
Figure 3D:
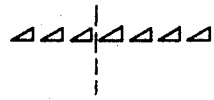
Figure 4:
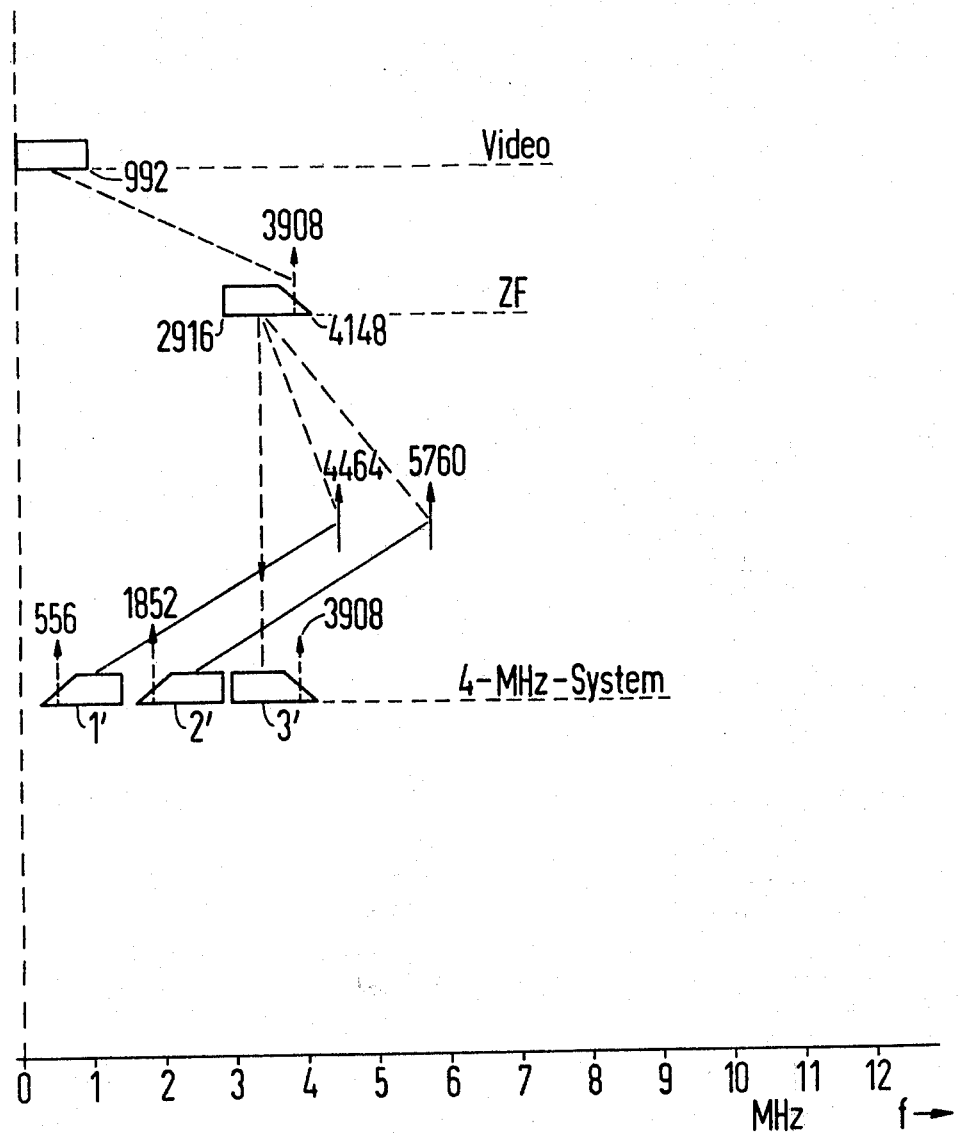
FIG. 4 is a frequency diagram for a fourth type of construction of the frequency multiplex system according to the invention.

In the frequency diagrams according to FIG. 1 and the two further frequency diagrams according to FIGS. 2 and 4 there is assumed in each case a frequency multiplex or carrier frequency system in which 4 kHz side telephone channels are converted, according to the principle of single-sideband transmission with suppressed carrier, in several stages into a transmission band of at least 4 MHz in width. Further signals, which require narrower or wider frequency bands than 4 kHz are fitted without overlap into the stepwise construction by the means that they are previously combined into channels of 4 kHz in width, or are inserted only at a higher plane of the stepwise structure.

In addition it is assumed that the stepwise construction of the transmission band is carried out through the utilization of carriers which in each case represent whole-numbered multiples of 4 kHz. Considerations within the scope of the invention lead to the conclusion that videophone channels in the narrower sense, i.e., their video bands should be transmitted according to the principle of single side-band transmission with residual side band and Nyquist flank and with a total band width of about 1 MHz and that these video bands should occupy in the frequency multiplex system the position of tertiary groups with 300 telephone channels. In the four frequency diagrams represented in the drawings, each of the carriers for the single or multi-stage conversion of the videophone channels from the video-position in the transmission position are chosen in such a way that the video carriers $f_m$ corresponding to the frequency of zero in the video position are in the transmission position odd multiples of 4 kHz.

There is observed, therefore, the condition $$f_m = m \cdot 8 \text{ kHz} + 4 \text{ kHz}$$

where $m =$ a whole number.

In particular, in fixing the frequencies of the video carriers in the aforementioned manner there is provided a further reduction of the possible interferences by choice of the line frequency $f_z$ of 8 kHz.

Aside from the appreciably smaller spectral constituents of the half-image and image-change frequency, the frequency mixture of the videophone signal in the carrier frequency transmission position is given by constituents of the form $$f_m + n \cdot f_z$$

with $-z \leq n \leq y$ (whole-numbered), $f_z$ being the line frequency of the videophonic signal. The magnitude $z$ determines, for example, the width of the Nyquist flank and the magnitude $y$ the videophone channel bandwidth. For the case that the video carriers represent all the odd-numbered multiples of 4 kHz and the line frequency $f_z = 8$ kHz, all the spectral constituents of the videophone channels in the transmission position are grouped about frequencies that present odd multiples of 4 kHz. All the nonlinear mixing products of second order, accordingly, lie in the transmission position in the vicinity of whole-numbered multiples of 8 kHz, i.e., exactly in the half-line offset to the useful videophone signals, and present, therefore, small influences that are hardly perceptible to the eye.

All the converter frequencies of the tertiary and quaternary group converters are then—as whole-numbered multiples of 8 kHz— likewise in the half-line offset to the useful videophone signals; i.e., their carrier residues interfere less severely in the videophone signal.

The position of the nonlinear mixing products is more clearly explained with the aid of the four partial diagrams of FIG. 3. In FIG. 3 trace ($a$) shows the position of two arbitrary carrier frequencies $f_m$ and $f1$ in the transmission position as well as the frequency spectrum belonging to it in spacings of the line frequency $f_z =$ kHz. On this basis, trace (b) shows as an example a spectrum of the mixing products of second order and trace (c) the normed frequency scale. The position of the telephone channels on this frequency scale is indicated in trace (d).

For the offset operation between telephone and videophone transmission an accuracy of the line frequency of the videophone signals of $$\frac{\Delta f_z}{f_z} 2 \times 10^{-5}$$

is sufficient. The greatest deviation of the interference components from the zero frequency for the highest video signal frequency is then $(2 \times 10^{-5}) \cdot 1$ MHz $= 20$ Hz.

In the two frequency plans described below according to FIGS. 2 and 4 the condition is fulfilled that the videophone carriers present in the transmission position odd multiples of 4 kHz. Moreover, in the conversion types according to FIGS. 1 and 2 in the usual manner the base tertiary group 812 to 2,044 kHz are converted in one or more stages into the transmission position, so that it suffices to choose the carriers for the one or more stages of conversion of the videophone channels from the video position into the position of the base tertiary group in each case in such a way that the videophone carriers corresponding to the frequency zero in the video position into the position of the base tertiary group are odd multiples of 8 kHz.

Two examples for construction of frequency multiplex systems according to the invention are shown in FIG. 1. Here the video band, limited, say, to 0 to 992 kHz, of a videophone channel is converted in two manners into the position 812 to 2,044 kHz of the base tertiary group TG, and, particularly, into a control position. The one type of conversion takes place directly by means of the 1,052 kHz carrier. The other type of conversion is carried out in two stages, and, namely, first by means of the 3,908 kHz carrier into an intermediate frequency position of 2,916 to 4,148 kHz, which is designated with ZF (intermediate frequency), into an inverted position and then, by means of the 4,960 kHz carrier, into the base tertiary group position GT. The 4,960 kHz carrier can be derived there in a simple manner by multiplication with the factor 40 from the base frequency of 124 kHz.

In both construction diagrams according to FIG. 1, the Nyquist flank is formed in each case in the first conversion. In the first example, therefore it is formed in the base tertiary group position GT and in the second example in the intermediate frequency position ZF.

The construction diagram according to FIG. 2 proceeds from a videophone channel which in the video position is limited to a frequency band from 1 to 1,000 kHz or from 0 to 906 kHz. By means of the carrier 1,812 kHz conversion is made from the video position directly into the base tertiary group GT, and namely in an inverted position, in which the frequency band in the first case goes from 812 to 2,044 kHz and in the second from 906 to 2,044 kHz. Through the trimming of the video band to an upper frequency limit of 906 kHz before the conversion it is achieved that the video band does not overlap with the corresponding converted partial band in the base tertiary group position GT, so that no interferences can result from this conversion.

The above-described types of conversion according to FIGS. 1 and 2 have in common the formation of a base tertiary group GT in the position 812 to 2,044 kHz. These base tertiary groups GT, each containing a videophone channel are, like the base tertiary groups occupied with telephone channels, then converted in usual manner over tertiary group carriers 10 560, 11 880 and 13 200 kHz into the position 8 516 to 12 388 kHz of the base quaternary group GQ. In the 12 MHz carrier frequency system the base quaternary group GQ already forms the uppermost part of the transmission band; the two lower parts each corresponding to a quaternary group of the transmission band of the 12 MHz system are formed by means of the quatenary group carrier 12 704 and 16 720 kHz. The lowest quaternary group 316 to 4,188 kHz of the 12 MHz transmission band presents simultaneously approximately the transmission band for a 4-MHz system.

FIG. 4 shows a construction diagram of a frequency multiplex system in which three videophone channels are converted in one and two conversion stages respectively, into the position of the 4-MHz-carrier frequency system. Here it is also possible to insert these three tertiary groups as lowest quaternary group into a frequency multiplex system with a greater frequency band width, for example, into the 12-MHz carrier frequency system.

The videophone channels are limited into the video position to a frequency band from 0 to 992 kHz and are converted by means of the 3,908 kHz carrier into an intermediate frequency position ZF (2,916 to 4,148 kHz), which corresponds to the approximate position of the third tertiary group of the transmission band of the 4-MHz and of the 12MHz-carrier frequency systems, respectively.

Under certain circumstances it is advantageous in the transmission of several videophone channels to use for each conversion into the intermediate frequency position ZF an individual generator per channel conversion and not to synchronize these generators, not even with the base generator of the telephone converter. In a multiple occupation with the videophone channels there then occurs, partially both for the peak load and also for the addition of nonlinear mixing products on the interval, a certain statistical distribution. Favorable conditions for the transmission system are given if the generator for the generation of the intermediate frequency of 3,908 kHz in the present case has a relative accuracy of $10^{-6}$, which corresponds to an absolute deviation of $\pm$ 4 Hz. This intermediate carrier frequency is expediently derived from a free vibrating quartz oscillator.

In the conversion of the videophone channels into the intermediate frequency position ZF the Nyquist flank is advantageously formed on the transmitting side, with a width of $\pm$ 150 to 250 kHz, since here there is provided the most favorable noise balance. In the present case there is formed a Nyquist flank of $\pm$ 240 kHz, so that the videophone channels in the intermediate frequency ZF extend over a frequency band from 29,060 to 4,148 kHz in inverted position (lower side band position).

For the transmission there remains a videophone channel in the approximate position 3' (2,916 to 4,148 kHz) of the 4-MHz and 12-MHz system, respectively; two further videophone channels are brought from the intermediate frequency position ZF by means of a 4,464 kHz carrier into the approximate position 1' of the first tertiary group, and by means of a 5,760 kHz carrier into the approximate position 2' of the second tertiary group of the aforementioned systems, in each case into a control position. Here the videophone channel 1' occupies the frequency band 316 to 1,548 kHz, in which the video carrier has a frequency of 556 kHz. The second videophone channel 2' occupies the frequency band 1,612 to 2,844 kHz, in which the video carrier has the frequency 1,852 kHz.

The two carriers with which the two last-mentioned videophone channels 1' and 2' are brought into their transmission position can be obtained in a simple manner from already present frequencies of the frequency multiplex system by multiplication in the following manner: 4,464 kHz = 36 · 124 kHz; 5,760 kHz = 40 · 144 kHz.

The construction of the 4-MHz system according to FIG. 4 can be compared with the construction of 15 secondary group blocks in pure telephone occupation. Proceeding from this "Base quaternary group with 15 secondary groups," broader systems can be constructed, just as in the case of telephony, with the same converter systems. This construction offers, therefore, for videophone channel transmissions, the same conditions for system structures as in the case of pure telephony occupation, and any desired mixing between videophone channels and 300-telephone groups can be carried out. Furthermore, in the 4-MHz system below 312 kHz there can still be transmitted the secondary group 1 with 60 telephone channels.

The type of derivation of the carriers described with the construction diagram according to FIG. 4 for the conversion from video position into the intermediate frequency position ZF by means of free-vibrating quartz oscillators can be used analogously also in the construction diagrams according to FIGS. 1 and 2. Thus, the 3,908 kHz carrier can be derived in one conversion type according to FIG. 1 in the same manner as in the construction diagram according to FIG. 4 to advantage for each videophone channel to be converted from an unsynchronized quartz oscillator of its own with a relative accuracy of $10^{-6}$, which corresponds to an absolute deviation of this carrier $\pm$ 4Hz. An absolute accuracy of 4Hz is likewise to be maintained for the particular carrier generators which generate the carriers 1052 kHz and 1,812 kHz, which are used in each case for a direct conversion from the video position into the base tertiary group position GT in the construction according to FIGS. 1 and 2.

Referring to FIG. 5 apparatus for carrying out the method of the invention is illustrated as comprising three modulators each referenced M3 which are respectively provided for converting the video band 0-922 kHz of a video channel with the help of the carrier $f_3 = 3,908$ kHz into the approximate frequency position of the third tertiary group TG3 which equals 2,916–4,148 kHz in an inverted position.

A vestigal side band filter VSF is connected to the output of each of the modulators M3 in order to suppress the undesired other side band. The converted or transformed band of the first videophone channel remains in this position while the converted band of the second video channel is transformed a second time into the approximate position of the second tertiary group TG2 which equals 1,612–2,844 kHz by means of a modulator M2 having the carrier $f_2 = 5,760$ kHz, and the converted band of the third video channel into the approximate position of the first tertiary group TG1 which equals 316–1,548 kHz by means of the modulator M1 having a carrier $f_1 = 4,464$ kHz. All three bands together result in the approximate transmission band 316–4,148 kHz of the prior art type 4 MHz carrier frequency system.

FIG. 6 illustrates apparatus for carrying out the method of the invention utilizing transmission techniques whereby the video band is also converted into the approximate position of the third tertiary group TG3 (2,916–4,148 kHz) in an inverted position, respectively with the help of a modulator M3 and a carrier frequency $f_3$ which equals 3,908 kHz. A vestigial side band filter VSF is connected to the output of the modulator to suppress the undesired other side band. Thereafter, the converted band is applied to a modulator M4 which transforms the video channel into the position of the basic tertiary group 812–2,044 kHz with the help of a carrier frequency $f_4 = 4,960$ kHz.

After the second transformation, the videophone channels are converted into the transmission position in the same manner, in one or several transformation stages, like the basic tertiary groups which are occupied by telephone channels. The exemplary embodiment therefore provides for this purpose two transformation stages U1 and U2. The transformation stage U1 comprises the tertiary groups in the basic tertiary group position and aligns the groups in a basic quaternary group position 8,516–12,388 kHz. Finally, the transformation stage U2 comprises several quaternary groups in the basic quaternary group position and aligns the groups in the 4 MHz or 12 MHz transmission band.

With the above described systems for the transmission of telephone and videophone channels, the telephone channels are respectively transformed into the transmission positions in stages by means of carriers which are integral multiples of 4 kHz. In this manner, the line frequency $f_z$ is equal to 8 kHz, which is advantageous for videophone signals. If, in addition, as is the case for the frequency schedules set forth herein, the carriers for a multistage transformation of the videophone channels from the video frequency position into the transmission frequency position are selected in such a way that the video carriers in the transformation position which correspond to the frequency zero are uneven multiples of 4 kHz, a grouping of all spectrum sections of the videophone channels in the carrier frequency transmission position will result around frequencies which are uneven multiples of 4 kHz. All non-linear mixed products of second order in the transmission position therefore lie near integral multiples of 8 kHz, i.e., exactly in the half-line offset to the useful videophone channels, and therefore merely represent interferences which can hardly be noticed by the human eye.

The construction of the conversion or transformation stages U1 and U2 is generally well known in the art and can be designed in a manner analogous to the arrangement disclosed in FIG. 2 of U.S. Pat. No. 3,518,376 to Kamen et al. The stages U1 and U2 each contain three balance modulators, after which a filter is connected whose outputs are combined by way of a mixer. The audio inputs of this generally known type of arrangement are replaced by the inputs for the wide band information bands of the basic tertiary groups or the basic quaternary groups, respectively. Finally, the carrier (40 kHz, 50 kHz, etc) is replaced in each of the stages by the tertiary group carriers 10,560, 11,880 and 13,200 kHz. By means of the conversion stage U2, the transmission band 316 . . . 12,388 kHz of the 12 MHz system is formed by the three basic quaternary groups and one of the three quaternary groups remains in its position, the second basic quaternary group is converted by means of the quaternary group carrier 12,704 kHz and the third basic group is converted by means of the quaternary group carrier 16,720 kHz in accordance with the methods set forth above. The lowest quaternary group 316 to 4,188 kHz of a 12 MHz transmission band simultaneously also constitutes the transmission band for a 4 MHz system.

Figure 7:
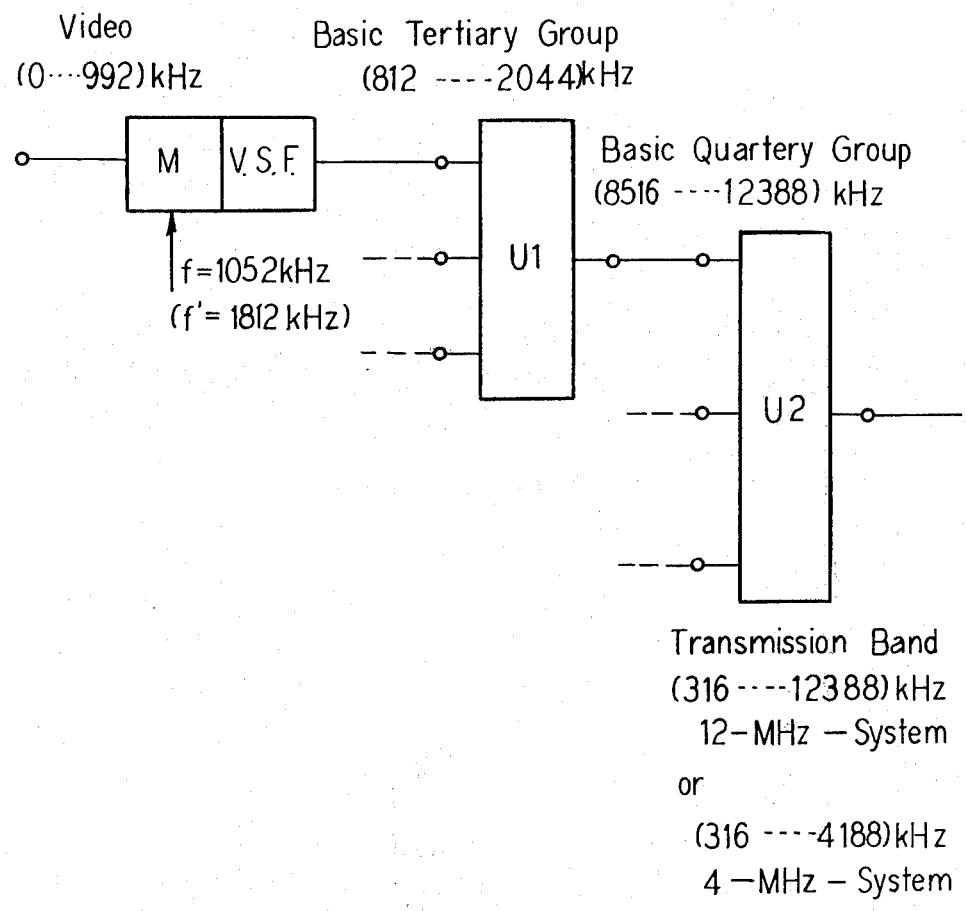
FIG. 7 is a schematic representation of apparatus for accomplishing conversion of a video channel into the basic tertiary group position for a 4 or 12 MHz system.

FIG. 7 illustrates apparatus for performing video channel transformation according to the present invention, e.g. see FIG. 2. The video band of the videophone channel is directly transformed into the position of the basic tertiary group 812–2,044 kHz with a modulator M. The modulator M is provided with a carrier frequency, in the case of direct transformation, of $f = 1,052$ kHz whereby the videophone channel takes the usual position.

In the transformation process wherein the videophone channel takes the inverted position in the basic tertiary group, the frequency of the applied carrier at the modulator M will be $f = 812$ kHz. In either of the foregoing cases, a vestigial side band filter V.S.F. is connected to the output of the modulator M to provide suppression of the mixed products positioned outside of the range of the basic tertiary group 812–2,044 kHz, in particular with respect to the other, undesired side band.

After the first transformation, the videophone channel is converted to the transmission position in one or several stages, according to the present invention, in the same manner as is the case with the basic tertiary groups occupied by telephone channels. The same embodiments therefore provide two transformation stages U1 and U2. The transformation stage U1 comprises three tertiary groups in the basic tertiary group position and aligns these groups in the basic quaternary group position 8,516–12,388 kHz. Finally, the transformation stage U2 comprises a plurality of quaternary groups in the basic quaternary group position and aligns the groups in the 4 MHz or 12 MHz transmission band.

As noted above, the structure of the conversion stages U1 and U2 is generally known in the art and can be designed in a manner analogous to the arrangement disclosed in FIG. 2 of U.S. Pat. No. 3,518,376. The stages U1 and U2, as before, each contain three balance modulators after which a filter is connected whose outputs are combined by way of a mixer. The audio inputs of this type of arrangement are replaced by the inputs for the wide band information bands of the basic tertiary groups or the basic quaternary groups, respectively. Finally, the carrier (40 kHz, 50 kHz, etc) is replaced in each of the stages by the tertiary group carriers 10,560, 11,880 and 13,200 kHz. By means of the conversion stage U2, the transmission band 316 . . . or 12,388 kHz of the 12 MHz system is formed by the three basic quaternary groups are one of the three quaternary groups remains in its position. The second basic quaternary group is converted by means of the quaternary group carrier 12,704 kHz and the third basic group is converted by means of the quaternary group carrier 16,720 kHz in accordance with the method set forth above with respect to FIG. 2. The lowest quaternary group 316 to 4,188 kHz of a 12 MHz transmission band, according to FIG. 2, simultaneously also constitutes the transmission band for a 4 MHz system.

While I have described my invention by reference to specific illustrative examples, many changes and modifications of the invention may be made by one skilled in the art without departing from the spirit and scope of the invention, and it is to be understood that I intend to include within the patent warranted hereon all such changes and modifications as may reasonably and properly be included within the scope of my contribution to the art.

I claim:

1. A frequency multiplex system which is employed for single side band transmission of telephone channels which are converted step-by-step into the position of the basic CCITT tertiary group 812–2,044 kHz by means of carriers representing integer multiples of 4 kHz, and thereafter converted in at least one step to transmission positions by means of carriers representing integer multiples of 8 kHz, and also employed for the transmission of videophone channels comprising means for transmitting respective videophone channels with residual side band and Nyquist slope in an entire bandwidth of a tertiary group including means for converting in at least one step the videophone channels from their video positions into the position of the CCITT basic tertiary group 812–2,044 kHz, means connected to the first-mentioned converting means for converting the videophone channels in at least one step into the transmission position as tertiary groups normally occupied by telephone channels, means connected to and providing carrier for the first-mentioned coverting means, each video carrier in the position of the basic tertiary group corresponding to the frequency zero in the video position and an odd multiple of 4 kHz, and means for providing a fixed line frequency of 8 kHz.

2. A carrier frequency multiplex system according to claim 1, comprising single stage conversion means including a source of carrier at an odd multiple of 4 kHz for converting videophone channels from their video positions to a basic tertiary group 812–2,044 kHz.

3. A carrier frequency multiplex system according to claim 2, wherein said source produces a carrier at 1,052 kHz.

4. A carrier frequency multiplex system according to claim 2, wherein said source produces a carrier at 1,812 kHz.

5. A carrier frequency multiplex system according to claim 2, wherein said source is a free running oscillator with an accuracy of ± 4 kHz.

6. A carrier frequency multiplex system according to claim 1, wherein said converting means includes means for converting each videophone channel from its video position into an approximate position of the third tertiary group in the transmission band of the system in an inverse position, said approximate position serving also as an intermediate position for further conversions.

7. A carrier frequency multiplex system according to claim 6, wherein said means for converting to the approximate position includes a source of carrier operating at 3,908 kHz for effecting the conversion.

8. A carrier frequency multiplex system according to claim 7, comprising other conversion means including a source of 4,464 kHz carrier for converting a videophone channel from the approximate tertiary group position to a first transmission position of the transmission band of the system.

9. A carrier frequency multiplex system according to claim 8, comprising further conversion means including a source of 5,760 kHz carrier for converting a videophone channel from the approximate tertiary group position to a second transmission position of the transmission band of the system.

10. A carrier frequency multiplex system according to claim 6, comprising means for transmitting a videophone channel in the approximate position of the third tertiary group.

11. A carrier frequency multiplex system according to claim 6, comprising second conversion means for converting the videophone channels from the intermediate positions to the position of a basic CCITT tertiary group 812–2,044 kHz and at least one more conversion means for converting a videophone channel from the third tertiary group position to the transmission position.

12. A carrier frequency multiplex system according to claim 11, wherein said second conversion means includes a source of 4,960 kHz carrier for effecting the conversion.

13. A carrier frequency multiplex system according to claim 6, comprising as a source of carrier for conversion a free running oscillator with an accuracy of $10^{-6}$.

14. A method of transmitting videophone signals in videophone channels in a carrier frequency multiplex system in which telephone channels are converted to the transmission band of the system with carriers which are whole number multiples of 4 kHz and transmitted by suppressed carrier techniques with single side band, comprising the steps of transmitting respective videophone channels with residual side band and Nyquist slope in an entire band width of a tertiary group including converting in at least one step the videophone channels from their video positions into the position of the CCITT basic tertiary group 812–2,044 kHz, converting the videophone channels in at least one step into the transmission position as tertiary groups normally occupied by telephone channels, applying carrier for the first conversion step wherein each video carrier in the position of the basic tertiary group corresponds to the frequency zero in the video position and to an odd multiple of 4 kHz, and providing a fixed line frequency of 8 kHz.

* * * * *